US009733351B2

(12) United States Patent
Kozma et al.

(10) Patent No.: US 9,733,351 B2
(45) Date of Patent: Aug. 15, 2017

(54) SURVEILLANCE AND TRACKING SYSTEM AND METHOD

(75) Inventors: Robert Kozma, Memphis, TN (US); Khan M. Iftekharuddin, Virginia Beach, VA (US); Lan Wang, Germantown, TN (US); Ross Deming, Winchester, MA (US)

(73) Assignee: The University of Memphis Research Foundation, Memphis, TN (US)

( * ) Notice: Subject to any disclaimer, the term of this patent is extended or adjusted under 35 U.S.C. 154(b) by 0 days.

(21) Appl. No.: 13/511,609

(22) PCT Filed: Dec. 6, 2011

(86) PCT No.: PCT/US2011/063430
§ 371 (c)(1),
(2), (4) Date: Dec. 19, 2012

(87) PCT Pub. No.: WO2012/078577
PCT Pub. Date: Jun. 14, 2012

(65) Prior Publication Data
US 2013/0241764 A1    Sep. 19, 2013

Related U.S. Application Data

(60) Provisional application No. 61/420,027, filed on Dec. 6, 2010.

(51) Int. Cl.
*G01S 13/56* (2006.01)
*G01S 7/00* (2006.01)
(Continued)

(52) U.S. Cl.
CPC ............... *G01S 13/56* (2013.01); *G01S 7/003* (2013.01); *G01S 13/726* (2013.01); *G01S 13/86* (2013.01)

(58) Field of Classification Search
CPC ........... G01S 13/56; G01S 13/86; G01S 13/66
(Continued)

(56) References Cited

U.S. PATENT DOCUMENTS 3,971,923 A * 7/1976 Linder .................... G01S 11/10
327/135
5,337,082 A * 8/1994 Fredericks .............. G01S 13/91
342/114

(Continued)

OTHER PUBLICATIONS

EasySen,"WiEye Sensor board for wireless survaillance and security applications",Jan. 29, 2008, Easysen, pp. 1-11.*

*Primary Examiner* — Timothy A Brainard
(74) *Attorney, Agent, or Firm* — Mintz Levin Cohn Ferris Glovsky and Popeo, P.C.; Peter F. Corless

(57) ABSTRACT

A system for detecting object movement including a sensory network having at least one sensory device using modulated radar for detecting an object in proximity to the sensory network. The sensory network including wireless transmission means and a base station having computer processing means located remote from the sensory network and including wireless transmission means to communicate with the sensory network. The base station having computer readable program code means for causing the computer processing means to analyze data received from the sensory network to determine motion characteristics of the object in proximity to the sensory network.

26 Claims, 5 Drawing Sheets

(51) Int. Cl.
*G01S 13/72* (2006.01)
*G01S 13/86* (2006.01)

(58) Field of Classification Search
USPC .......................................................... 342/107
See application file for complete search history.

(56) References Cited

U.S. PATENT DOCUMENTS

| | | | | |
|---|---|---|---|---|
| 6,061,014 | A * | 5/2000 | Rautanen | G01S 13/867 342/28 |
| 6,489,917 | B2 * | 12/2002 | Geisheimer | G01S 13/56 342/109 |
| 7,680,599 | B1 * | 3/2010 | Steadman | G01V 1/223 702/14 |
| 7,884,727 | B2 * | 2/2011 | Tran | A61B 5/0006 307/117 |
| 8,004,451 | B2 * | 8/2011 | Wu | G08B 13/2494 342/205 |
| 8,275,544 | B1 * | 9/2012 | Wells | G01C 21/165 342/146 |
| 2006/0284756 | A1 * | 12/2006 | Orr | G01S 7/022 342/20 |
| 2007/0247352 | A1 * | 10/2007 | Michael | G01S 13/34 342/128 |

* cited by examiner

SURVEILLANCE AND TRACKING SYSTEM AND METHOD

CROSS REFERENCE TO RELATED APPLICATIONS

This application claims priority to U.S. Patent Application Ser. No. 61/420,027 filed Dec. 6, 2011, which is incorporated herein by reference in its entirety.

FIELD OF THE INVENTION

The invention relates to a system and method for detecting, identifying and tracking moving objects, and more specifically, relates to a system and method using intelligent decision making for identifying unique but similar events relating to moving objects.

BACKGROUND OF THE INVENTION

There are many situations where the courses of multiple objects in a region must be tracked. Typically, radar is used to scan the region and generate discrete images or "snapshots" based on sets of returns. In some types of tracking systems, all the returns from any one object are represented in an image as a single point unrelated to the shape or size of the objects. "Tracking" is the process of identifying a sequence of points from a respective sequence of the images that represents the motion of an object. The tracking problem is difficult when there are multiple closely spaced objects because the objects can change their speed and direction rapidly and move into and out of the line of sight for other objects. The problem is exacerbated because each set of returns may result from noise as well as echoes from the actual objects. The returns resulting from the noise are also called false positives. Likewise, the radar will not detect all echoes from the actual objects and this phenomena is called a false negative or 'missed detect' error. For tracking airborne objects, a large distance between the radar and the objects diminishes the signal to noise ratio so the number of false positives and false negatives can be high. For robotic applications the power of the radar is low and as a result, the signal to noise ratio can also be low and the number of false positives and false negatives high.

Accordingly there exists a need to provide an improved radar system for detecting, identifying, and tracking objects and dismounts over a wide area, even in noisy conditions.

SUMMARY OF THE INVENTION

In one aspect, a system and method for surveillance and tracking is described in which an aspect of an illustrated embodiment of the invention includes providing a sensory network having at least one sensory device using modulated radar for detecting an object in proximity to the sensory network wherein the sensory network includes a wireless transmission system. Also provided is a base station having a computer processing system located remote from the sensory network and further including a wireless transmission system adapted and configured to communicate with the sensory network. The base station being provided with computer readable programming code for causing the computer processing system to analyze data received from the sensory network to determine motion characteristics of the object in proximity to the sensory network.

In further, optional aspects, the sensory network preferably includes a plurality of nodes each including at least one sensory device wherein each of sensory devices is selected from the group consisting of: radar devices; acoustic measuring devices; infrared measuring devices and vibration sensing devices and the like. It is noted, the at least one sensory device may further include a Gunn diode oscillator transmitting a continuous radar wave.

In a further aspect, a method for detecting object movement is described including the steps of providing a sensory network having at least one sensory device using modulated radar for detecting an object in proximity to the sensory network. The sensory network having a wireless transmission system which preferably includes a radar device/system, a first sensor for detecting movement and a second sensor for complementary sensory information such as acoustic and vibration. Further included is a base station having a computer processing system located remote from the sensory network and including a wireless transmission system adapted and configured to communicate with the sensory network. In operation, when an object is in proximity to the sensory network, the first sensor detects the movement and sends a signal to the radar and wherein the second sensor starts collecting data. Thereafter, data is analyzed in the base station as received from the sensory network to determine motion of the object.

Accordingly a need exists to provide an improved radar system for detecting, identifying, and tracking objects and dismounts over a wide area, even in noisy conditions.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

Figure 1A:
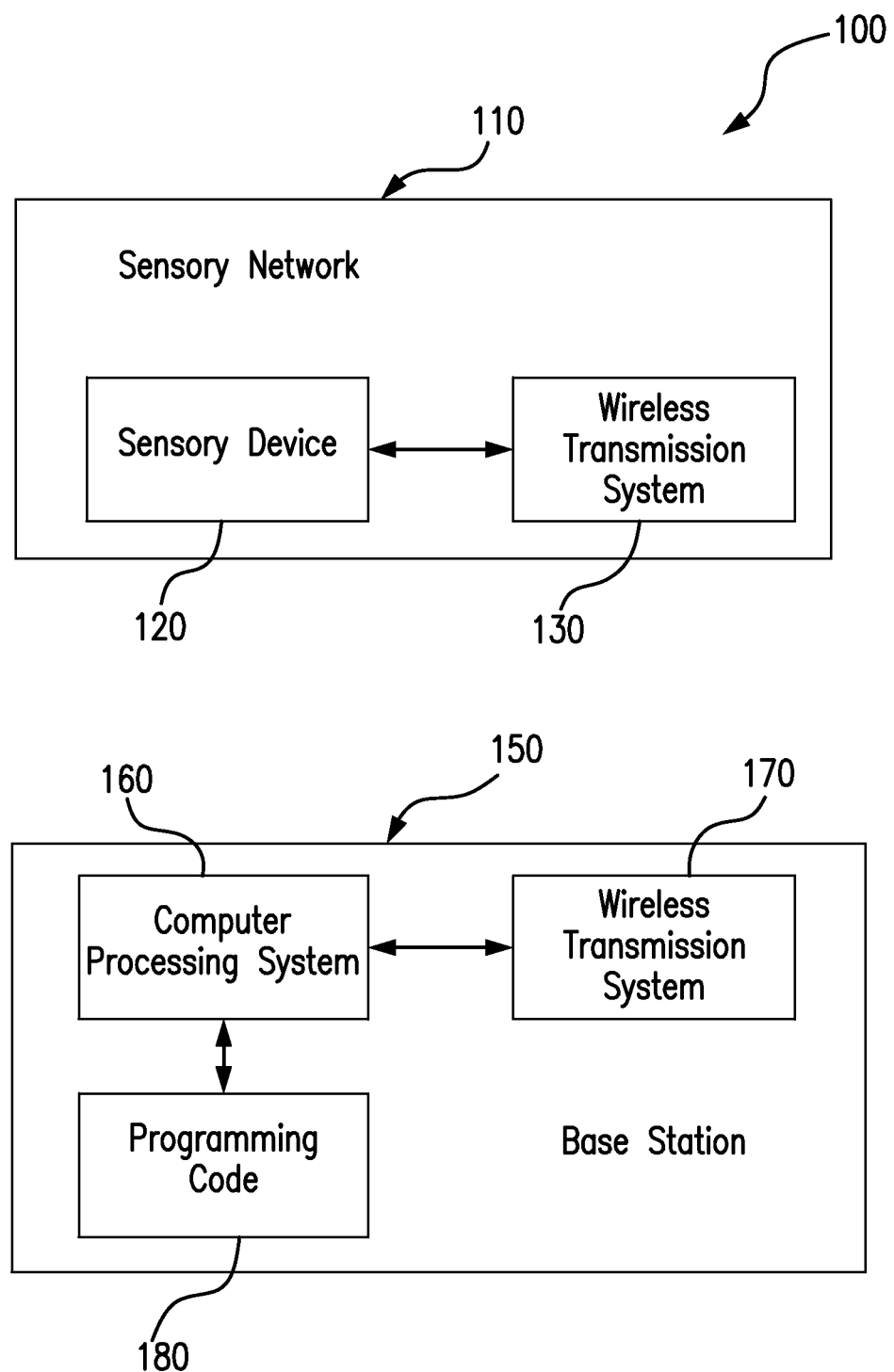
FIG. 1A is a schematic depicting a radar network system in accordance with an illustrated embodiment of the invention.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

It is to be appreciated the embodiments of this invention as discussed below preferably use software algorithm, program or code residing on computer useable medium having control logic for enabling execution on a machine having a computer processor. The machine typically includes memory storage configured to provide output from execution of the computer algorithm or program.

In the description that follows, certain embodiments may be described with reference to acts and symbolic representations of operations that are performed by one or more computing devices. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, tablet, handheld or laptop devices, personal digital assistants, multiprocessor systems, microprocessor-based systems, set top boxes, programmable consumer electronics, network, minicomputers, server computers, game server computers, web server computers, mainframe computers tablet and like devices, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Additionally, as used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

In accordance with an illustrated embodiment of the invention, an autonomous sensor network is described which in one illustrated embodiment is preferably a collection of sensor nodes with limited processing, power, and communication capabilities that monitor the real world environment through differing modalities. Preferably the nodes gather information about the local environment, pre-process the data, and transmit the output preferably via wireless channels to a base station. The base station may be configured and operative to broadcast commands to all or some of the sensor nodes in the network. Preferably the intelligent framework design network in accordance with the present invention provides decision making capabilities and the capability to detect, track, and identify targets over a wide area. It is to be appreciated sensor networks are often composed of sensor nodes mounted on autonomous vehicles, on the ground, and/or within remote base stations. It is to be appreciated, in actual deployment environments, a sensor node may not be able to communicate with all the other nodes within its physical wireless transmission range. Difficulties presented include dynamic network partition due to, for instance, node mobility, node failures, wireless channel interference/fading, and/or network congestion. Thus, an object of the invention is to assure reliable communication among the sensor nodes and with a remote base station in view of such adverse considerations. Another object of the invention is to minimize target detection delay and maximize classification accuracy, while minimizing the consumption of network resources, such as bandwidth, memory, power and the like.

With reference to FIG. 1A, and as will be described in further detail below, an illustrated embodiment of the invention relates to a system and method for detecting object movement, generally referenced by numeral 100. In accordance with the illustrated embodiment of FIG. 1A, included is a sensory network 110, having at least one sensory nodal device 120 adapted and configured to implement modulated radar for detecting an object in proximity to the sensory network. The sensory network 110 includes wireless transmission means 130. Further provided in system 100 is a base station 150 having a computer processing system 160 located remote from the sensory network 110 and including a wireless transmission system 170 to preferably communicate with the sensory network 110 via wireless transmission system 130, preferably of any known means. The base station 150 having computer readable programming code 180 for causing the computer processing system 160 to analyze data received from the sensory network 110 to determine motion characteristics of the object in proximity to the sensory network 110 wherein the computer readable programming code 180 is adapted and configured to cause the computer processing system 160 to analyze data received from the sensory network 100 to determine range of distance between an object and the sensory network 110, and motion characteristics of the object relative to the sensory network 110. Further, the computer processing system 160 of the base station 150 is adapted and configured to provide control signals to the sensory network 110 for controlling operation of the sensory network 110.

It is to be understood and appreciated the illustrated embodiment of the invention provides a sensory network 110 preferably consisting of several sensor devices 120 including radar, infrared, acoustic, and magnetic node sensors, that can be used as an integrated surveillance and sensing system. It is to be appreciated and understood short-range radar detectors have been used in commercial applications, including traffic management, and proximity sensing. It is to be appreciated, an on object of the invention is to provide a low-cost miniature radar system 100 having detection, ranging and velocity estimation capabilities. A further object is the integration of a miniature radar system with other sensor data to provide a robust pervasive sensor system 100 preferably using multi-modal technology.

Now described are K-band radar components which are preferably used on the sensor nodes 120 to detect and characterize targets, as discussed further below. Also described are various hardware components that combine the various sensor modalities into a single, autonomous node. For instance, included in the various hardware components are preferably RF transceivers, such as those manufactured by M/A-COM (Tyco Electronics) model MACS-007802-0M1RSV, and which are currently used primarily for automotive applications for detecting front and rear-end collisions, for use in ground speed measurement purposes, and as motion detectors (e.g., automatic door openers). Preferably the radar of an illustrated embodiment of the invention may utilize a Gunn diode oscillator which transmits, but is not to be understood to be limited thereto, a continuous wave of approximately 24.125 GHz. The Gunn diode oscillator may also for instance operate with a 0.3 GHz of bandwidth (also to be understood not to be limited thereto) which can be controlled by applying an external voltage making it capable of estimating target range and velocity. The Gunn diode oscillator preferably has a low-power consumption (typically <0.5 Watt) and has compact dimensions rendering it suitable for use in a distributed network environment.

Preferably, an illustrated embodiment of the invention includes an external voltage pulse ramp using a waveform generator which is applied to the radar (e.g., the Gunn diode oscillator) so as to emit a continuous frequency modulated K-band signal having an approximate 300 MHz bandwidth. Preferably, the received energy is internally mixed with the transmitted signal and low-pass filtered to supply in-phase and quadrature output components. Preferably, a Fast Fourier Transform (FFT) is performed over samples within the chirp (fast-time) to extract range information about a target. A second FFT is preferably performed over a series of chirps (slow-time) to estimate the velocity of the target.

Figure 1B:
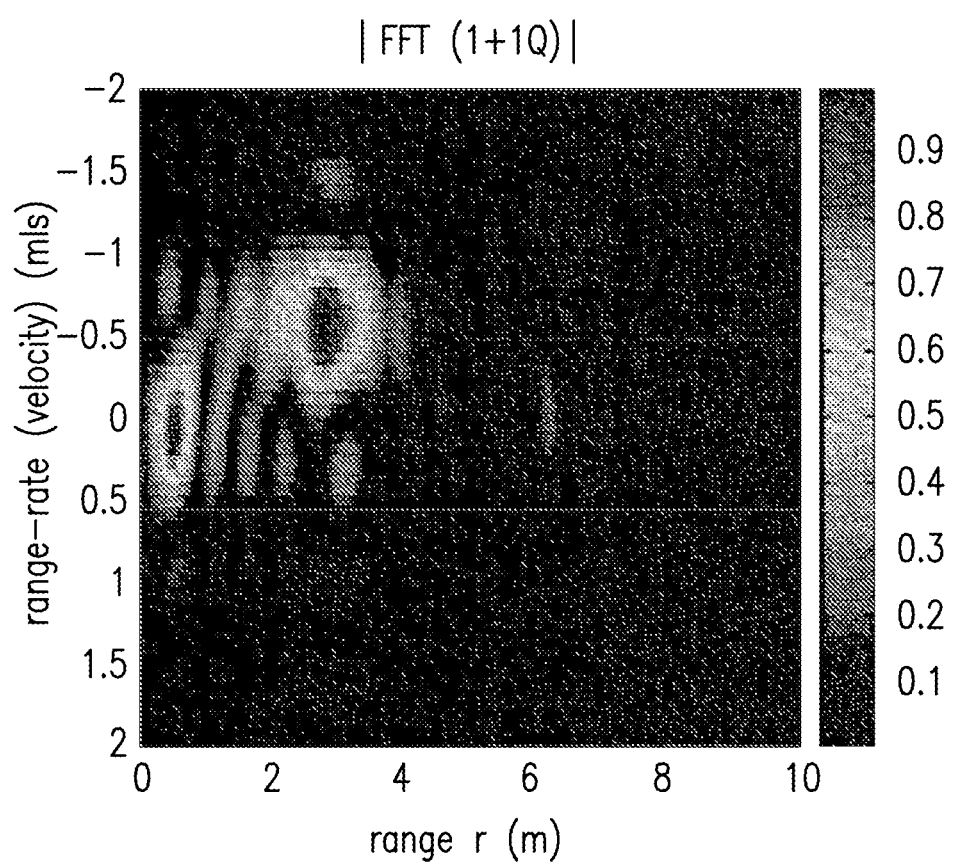
FIG. 1B is a pictoral representation of radar results of range-rate (velocity) vs. range intensity plot of an object dismount.

With reference now to FIG. 1B, illustrated are graphic pictorial results of a moving dismount object experiment performed with the aforesaid radar. In the embodiment of the invention used in the experiment, the radar was supplied with a ramp waveform (between 0.5 and 10 volts) at a PRF of 1 kHz, and a human dismount object walked toward the radar at approximately 0.5 m/s. When the target was approximately 3 meters away, the complex output waveforms were captured on an oscilloscope with over 10 ramp cycles (chirps). The data was processed and displayed on the range/Doppler intensity plot (normalized), as illustrated in FIG. 1B. It is to be appreciated the energy is concentrated at the proper location representing scattering from the moving dismount. It is also to be appreciated the range-rate is pointed in the negative region of the graph along the y-axis as the target is moving toward the radar and distance is decreasing, which will be the reverse when the target moves away from the radar. Described below is cross-validation of the radar sensor output with other type of sensor nodes 120.

With regards now to cross-validation of the radar sensor output with other type of sensor nodes, it is to be understood within a distributed network, radar data is supplemented with data obtained using first and second wireless sensor boards. For ease of illustration and descriptive purposes, in the described illustrated embodiment, the first wireless sensor board is to be understood to be a commercially available WiEye sensor board and the second wireless sensor board is to be understood to be a commercially available SBT80 Multi Modality sensor board, each having a range of modalities. Further, it is to be appreciated and understood the aforesaid first and second wireless sensor board are not be understood to be limited to a WiEye sensor board and an SBT80 Multi Modality sensor board as they are to be understood to encompass any suitable type of sensor devices.

Preferably, in the current described illustrated embodiment, each sensor board sits atop a TELOSB MOTE platform capable of storing, processing, and transmitting sensor data wherein multiple modalities provide improved reliability and classification by cross-correlating and integrating the sensor outputs. The aforesaid WiEye sensor platform preferably continuously monitors the environment and provides an initial detection capability preferably using a long range passive infrared sensor that detects moving vehicles up to a 50 m range, and moving dismounts (e.g., humans) up to a 10 m range. Preferably, the wide-angle detection region is bounded by a 100 degree cone and thus the aforesaid WiEye sensor boards operate as "sentry" nodes which preferably activate the radar and SBT80 nodes when a target is in range.

It is to be appreciated, the SBT80 sensor platform preferably contains several sensor modalities that can be used for classification purposes wherein a dual axis magnetometer measures variations in the local magnetic field as ferrous metals transverse in proximity to it. The collected data can be used to create signatures for different vehicle models, or to determine if individuals are carrying large metal objects. Preferably, an acoustic sensor is provided for receiving a raw audio waveform of the surrounding area. Additionally, a dual axis accelerometer is also included for providing seismic information which can be used to detect a detonation or infer characteristics of a target. It is further to be appreciated that the SBT80 sensor platform may also include other optical and temperature sensors not specifically set forth herein. For illustration purposes, an overview of the sensor modalities in a distributed sensor system is given in below Table I.

TABLE I

| Platform | Sensor Type | Description |
| --- | --- | --- |
| Tyco MACOM | Radar | K-band 24.125 GHz |
| WiEye EasySen | Passive Infrared | Long-range (20-150 ft) |
| | Visual Light | Photodiode |
| | Acoustic | Microphone |
| SBT80 EasySen | Acoustic | Microphone omni-direct |
| | Magnetic | Dual-axis, <0.1 mGauss |
| | Acceleration | Dual-axis 800 mV/g |
| | Infrared | Silicon photodiod |
| | Visual Light | Photodiode |
| | Temperature | Analog. |

It is to be appreciated and understood experiments with various target configurations using model trains as moving targets have been conducted wherein as the target enters the WiEye sentry field-of-view, the WiEye broadcasts a wake up message to the radar and to the SBT80 motes, which capture multiple sensor data sets. In order to capture velocity, a series of timestamps are sent to the base station. It is to be appreciated clocks have been synchronized in each experiment using timestamp beacons. Using the location information of the sentries and their timestamps, the velocity can be estimated in order to validate radar results.

Further, Multiple Signal Classification (MUSIC) algorithms were used for spectral density estimation for all sensory modalities which facilitated unified data processing and consequent data integration. It is to be appreciated MUSIC algorithms estimate the eigenvectors of the sample correlation matrix utilizing the pseudo-spectrum estimate of the mean corrected input signal for each sensor at normalized frequencies at which the pseudospectrum is evaluated.

It is to be appreciated and understood the wireless mote platform in accordance with the illustrated embodiments of the invention support a wide variety of sensor modalities. For example, both the WiEye and SBT80 sensor board preferably have on board circuitry and sockets to plug directly into the TelosB mote. The TelosB mote typically contains 8 input ports that connect directly to an Analog to Digital Controller preferably located on the TelosB mote's microcontroller. The TelosB mote also preferably contains output ports connected to the Digital to Analog Controller (DAC) as well as the ability to supply the required power from its own battery supply. The WiEye and SBT80 sensor boards preferably require no modification to work with the TelosB mote as they are manufactured to be essentially plug and play with the TelosB platform.

Figure 2:
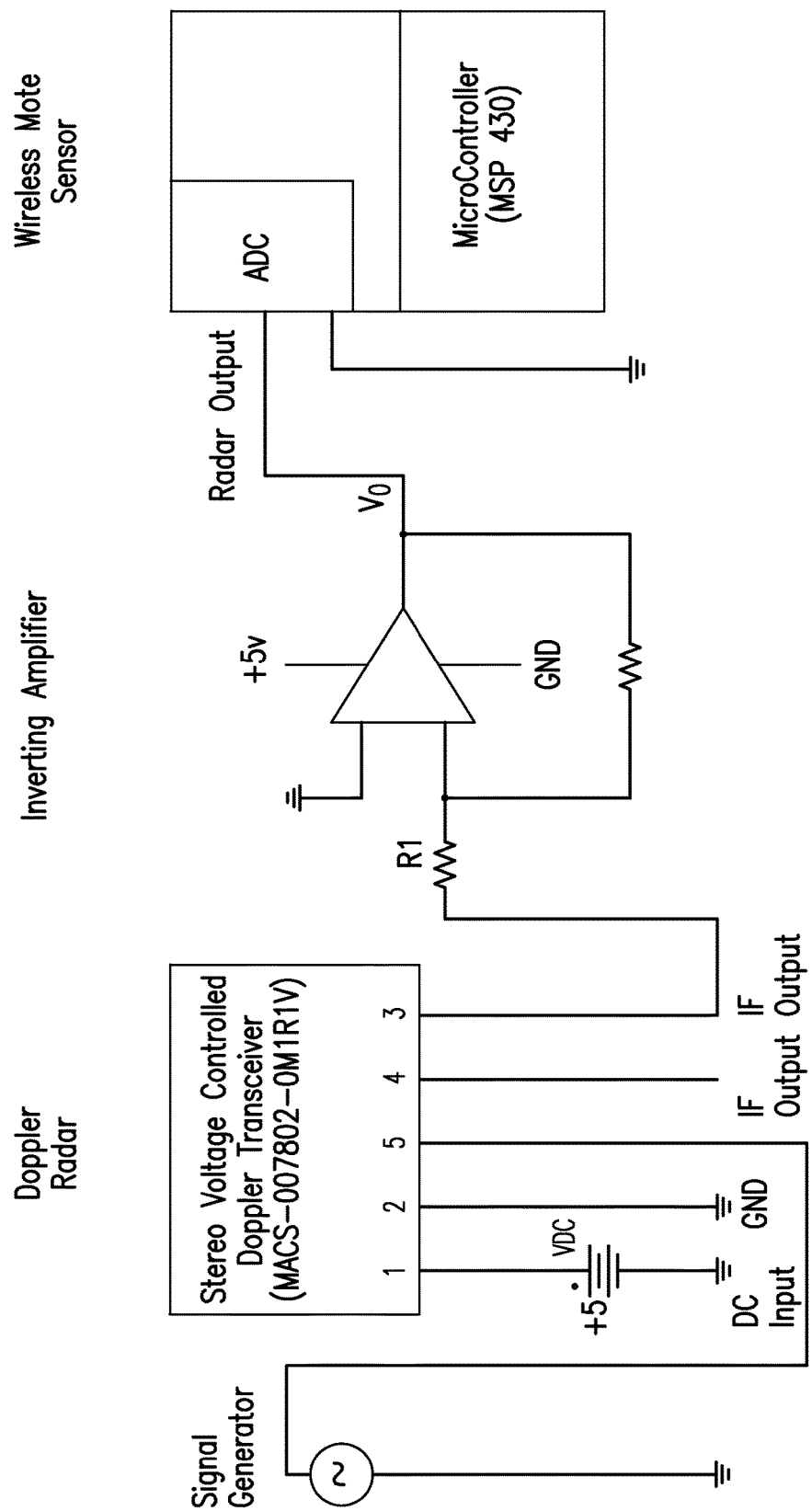
FIG. 2 is a circuit diagram depicting certain components of the present invention in accordance with an illustrated embodiment.

With reference now to FIG. 2, shown is an illustrated embodiment of the hardware setup of radar mote system in accordance with the invention. Both the Doppler radar and mote Sensor are coupled to a common power source. The mote has an on board power regulator that steps power supply down to the motes operating range.

To assure the aforesaid integrated system provides reliable and accurate reading of the actual signal from the radar using the mote, mote ADC preferably has a 12 bit resolution. A sampling speed of 200 kHz is achieved by tuning the programmable parameters of the mote ADC using standardized TinyOS data structures and interfaces. To compensate for the negative voltage output of the radar unit, an inverting amplifier is constructed, which transmits the signal to the wireless mote ADC unit. In the illustrated embodiment, the Doppler radar receives its tuning voltage input from a signal generator. However, it is to be understood signal generator chips can also be used.

Figure 3:
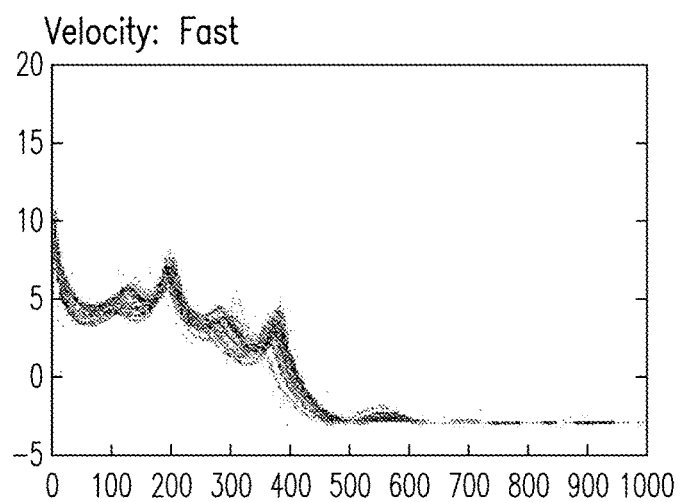
FIG. 3 depicts examples of MUSIC power spectrum estimations of vibration signals in accordance with the present invention.
Figure 3:
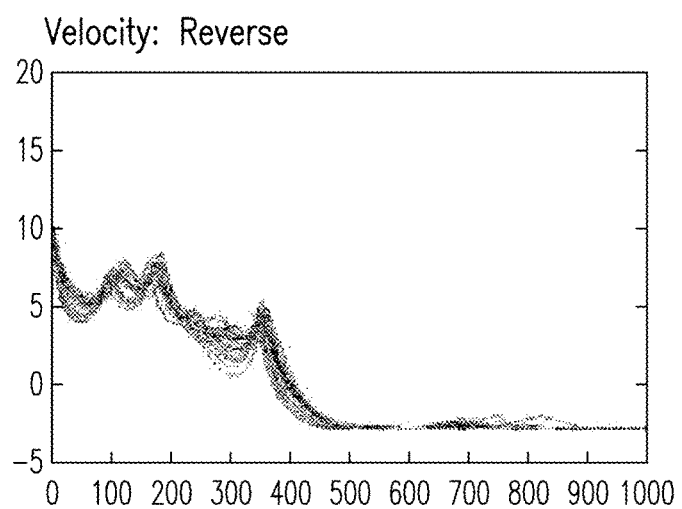
Figure 3:
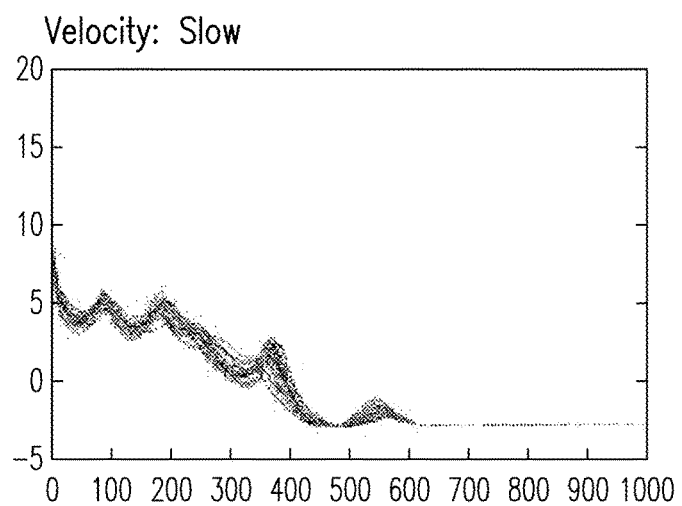

With reference now to FIG. 3, illustrated are pictorial examples of MUSIC power spectrum estimations for the vibration signals relative to: full forward movement, backward movement, and slow movement, respectively. The pseudo-spectrum is estimated for multiple runs for each experimental and target configuration. The power spectra have characteristic peaks in which the average peak value over multiple experiments are shown in Table II. It is to be appreciated the error of the peak frequency evaluation is +/−20 Hz, indicating that the observed shift in the frequencies can be used to classify movement types.

TABLE II

| Movement Class | Peak 1 (Hz) | Peak 2 (Hz) | Peak 3 (Hz) | Peak 4 (Hz) |
| --- | --- | --- | --- | --- |
| Forward Fast | 134 | 204 | 284 | 386 |
| Backward | 94 | 194 | * | 382 |
| Forward Slow | 112 | 182 | * | 364 |

It is to be further appreciated a power spectral estimation (PSD) has been conducted for the other sensory modalities.

Figure 4:
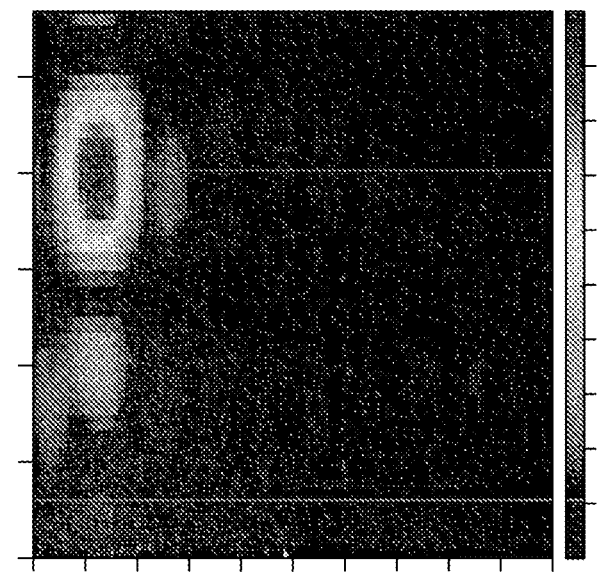
FIG. 4 illustrates pictoral examples of Doppler estimation of range and velocity.
Figure 4:
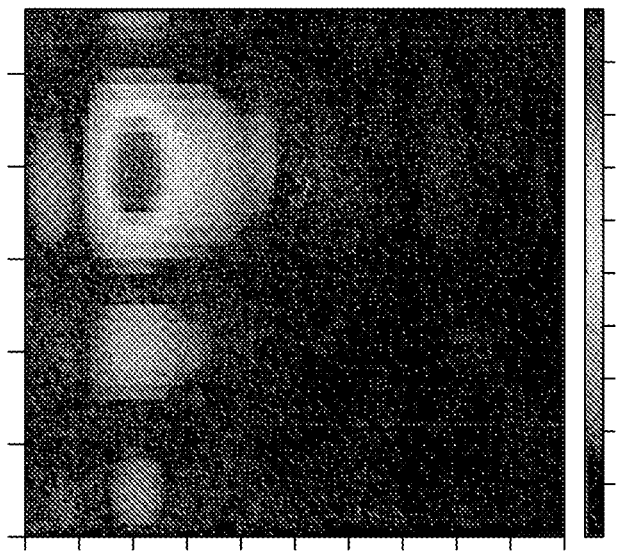

Additionally, spectral estimation for the radar data shows that the power spectra change depending on the reflectivity, which effect can be used to estimate radar cross section. FIG. 4 illustrates examples of Doppler estimation of range and velocity in the case of low reflectivity. Thus, it is to be appreciated that even with low reflectivity, the Doppler method is operative for target tracking.

The present invention, as described above in accordance with the illustrated embodiments provides a system and method for detecting, tracking and classifying different targets and events. Preferably, the distributed system, in accordance with the illustrated embodiments of the invention consists of a suite of radar transceivers, supplemented by acoustic, vibration, magnetic, and infrared sensors. Some of the advantages of the present invention, in accordance with the illustrated embodiments, are summarized as follows:

The Doppler radar can detect the range and velocity of a target with good precision which is validated by measurement using WiEye sensors;

The radar, in conjunction with other sensors can be used effectively to classify different types of objects and events; and Integrating the radar sensors with wireless sensor motes using WiEye and SBT80 platform provides a robust system, which can aim a decision support system for surveillance and tracking in difficult scenarios.

The acoustic and vibration sensors provide information complementary to the radars. For example, for given range and velocity parameters determined by the radar sensors, the actual scenario of the movement of the target can vary depending on the actual track characteristics. Using multiple sensors the variable features of an object can be accounted for, such as humans, dismounts, and vehicles.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the scope of the present invention.

What is claimed is:

1. A system for detecting object movement comprising:
a sensory network having at least one sensory device using modulated radar for detecting an object in proximity to the sensory network, the sensory network including wireless transmission means and a Doppler radar transceiver coupled to an inverting amplifier which couples to a wireless mote sensor; and
a base station having computer processing means located remote from the sensory network and including wireless transmission means to communicate with the sensory network, the base station having computer readable program code means for causing the computer processing means to analyze data received from the sensory network including data obtained by the Doppler radar transceiver to determine motion characteristics of the object in proximity to the sensory network, the motion characteristics including at least a range of distance between the object and the sensory network, wherein
the inverting amplifier receives an output signal directly from the Doppler radar transceiver, inverts the received output signal, and transmits the inverted output signal directly to the wireless mote sensor, the inverted output signal is received at the wireless mote sensor via an Analog-to-Digital Converter (ADC) provided on the wireless mote sensor, and a microcontroller provided on the wireless mote sensor processes the inverted output signal received at the wireless mote sensor to form a decision support system supporting the motion characteristics determined by the base station.

2. A system for detecting object movement as recited in claim 1, wherein the computer processing means of the base station is operable to provide control signals to the sensory network for controlling operation of the sensory network.

3. A system for detecting object movement as recited in claim 1, wherein the sensory network includes a plurality of nodes each including at least one sensory device.

4. A system for detecting object movement as recited in claim 3, wherein each of sensory devices are selected from the group consisting of: radar devices; acoustic measuring devices; infrared measuring devices and vibration sensing devices.

5. A system for detecting object movement as recited in claim 1, wherein the at least one sensory device includes a Gunn diode oscillator transmitting a continuous radar wave.

6. A system for detecting object movement as recited in claim 5, wherein the at least one sensory device has a continuous frequency of approximately 24.125 GHz and provides a bandwidth operating frequency of approximately 0.3 Ghz.

7. A system for detecting object movement as recited in claim 5, wherein the at least one sensory device is controlled by an external voltage.

8. A system for detecting object movement as recited in claim 7, wherein the sensory network includes means for applying an external voltage pulse ramp to the at least one sensory device using a wave form generator.

9. A system for detecting object movement as recited in claim 1, wherein the sensory network includes means for mixing received signals from the at least one sensory device with its transmitted signal, and means for applying a low-pass filter to the mixed signal to provide in-phase and quadrature output signal components.

10. A system for detecting object movement as recited in claim 1, wherein the computer processing means of the base station is operable to perform a first fast fourier transform on received signals from the sensory network to extract range of distance information regarding an object relative to its distance from the at least one sensory device.

11. A system for detecting object movement as recited in claim 1, wherein the computer processing means of the base station is operable to perform a fast fourier transform on received signals from the sensory network to determine velocity information of an object relative to the sensory network.

12. A system for detecting object movement as recited in claim 1, wherein the sensory network further includes a sensor node platform.

13. A system for detecting object movement as recited in claim 12, wherein the sensory sensor node is a wireless sensor board.

14. A system for detecting object movement as recited in claim 13, wherein the wireless sensor board provides initial detection of an object in proximity to the sensory network.

15. A system for detecting object movement as recited in claim 13, wherein the wireless sensor board includes a long range passive infrared sensor for detecting a moving object for triggering operation of the at least one sensory device of the sensory network.

16. A system for detecting object movement as recited in claim 13, wherein the wireless sensor board is a SBT80 Multi Modality sensor board.

17. A system for detecting object movement as recited in claim 1, wherein the sensory network further includes a Multi Modality sensor board to determine characteristics of an object in proximity to the sensory network.

18. A system for detecting object movement as recited in claim 17, wherein the Multi Modality sensor board is a wireless sensor board.

19. A system for detecting object movement as recited in claim 17, wherein the Multi Modality sensor board includes a dual axis magnetometer operable to determine variations in a local magnetic field regarding ferrous metals present in an object in proximity to the sensory network.

20. A system for detecting object movement as recited in claim 17, wherein the Multi Modality sensor board includes an acoustic sensing element for detecting an audio waveform emitting from an object in proximity to the sensory network.

21. A system for detecting object movement as recited in claim 17, wherein the Multi Modality sensor board includes a dual axis accelerometer for detecting seismic activity emitting from an object in proximity to the sensory network.

22. A system for detecting object movement as recited in claim 17, wherein the Multi Modality sensor board includes a temperature sensor for detecting temperature characteristics of an object in proximity to the sensory network.

23. A method for detecting object movement comprising the steps of:

providing a sensory network having at least one sensory device using modulated radar for detecting an object in proximity to the sensory network, the sensory network including wireless transmission means, a Doppler radar transceiver coupled to an inverting amplifier which couples to a wireless mote sensor, a first wireless sensor board, and a second wireless sensor board;

providing a base station having computer processing means located remote from the sensory network and including wireless transmission means to communicate with the sensory network;

analyzing data in the base station received from the sensory network including data obtained by the Doppler radar transceiver to determine motion characteristics of the object in proximity to the sensory network, the motion characteristics including at least a range of distance between the object and the sensory network; and sending a signal from the first wireless sensor board to the at least one sensory device and the second wireless sensor board when movement of the object in proximity to the sensory network is sensed, wherein the inverting amplifier receives an output signal directly from the Doppler radar transceiver, inverts the received output signal, and transmits the inverted output signal directly to the wireless mote sensor, the inverted output signal is received at the wireless mote sensor via an Analog-to-Digital Converter (ADC) provided on the wireless mote sensor, and a microcontroller provided on the wireless mote sensor processes the inverted output signal received at the wireless mote sensor to form a decision support system supporting the motion characteristics determined by the base station.

24. A system for detecting object movement as recited in claim 23, wherein the second wireless sensor board is a SBT80 Multi Modality sensor board.

25. A method for detecting object movement as recited in claim 23, further including the step of transmitting time steps from the sensory network to the base station for synchronizing the sensory network with the base station using time signal beacons.

26. A method for detecting object movement as recited in claim 25, further including the step of determining the velocity of an object relative to the sensory network by correlating location information of the object as detected by the at least one sensory device with the time signal beacons.

* * * * *